(12) United States Patent
Sakakibara et al.

(10) Patent No.: US 7,156,623 B2
(45) Date of Patent: Jan. 2, 2007

(54) ELECTRIC OIL PUMP APPARATUS

(75) Inventors: Isao Sakakibara, Aichi-ken (JP); Eiji Miyachi, Nishio (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 272 days.

(21) Appl. No.: 10/386,512

(22) Filed: Mar. 13, 2003

(65) Prior Publication Data

US 2004/0013541 A1    Jan. 22, 2004

(30) Foreign Application Priority Data

Mar. 13, 2002    (JP) .............................. 2002-068445

(51) Int. Cl.
F04B 49/00    (2006.01)

(52) U.S. Cl. ................... 417/310; 417/360; 417/410.3; 417/410.4; 417/423.14; 417/423.7

(58) Field of Classification Search ............. 417/410.3, 417/410.4, 310, 360, 423.7, 423.14
See application file for complete search history.

(56) References Cited

U.S. PATENT DOCUMENTS

| | | | |
|---|---|---|---|
| 2,709,965 A | | 6/1955 | Litzenberg |
| 4,525,126 A | | 6/1985 | Laumont |
| 4,540,347 A | * | 9/1985 | Child .......................... 417/310 |
| 4,679,994 A | * | 7/1987 | Brown ........................ 417/525 |
| 5,006,048 A | * | 4/1991 | Jow ........................ 417/410.4 |
| 5,053,664 A | * | 10/1991 | Kikuta et al. ................ 310/114 |
| 5,073,735 A | * | 12/1991 | Takagi .......................... 310/71 |
| 5,145,348 A | * | 9/1992 | Zumbusch ................... 418/171 |
| 5,895,207 A | | 4/1999 | Burgdorf et al. |
| 6,129,176 A | * | 10/2000 | Hunsberger et al. ..... 417/410.4 |
| 6,149,410 A | * | 11/2000 | Cooper ........................ 418/32 |
| 6,609,899 B1 | * | 8/2003 | Finnamore ................... 417/360 |
| 6,644,942 B1 | * | 11/2003 | Rival et al. .............. 417/410.4 |

FOREIGN PATENT DOCUMENTS

| | | |
|---|---|---|
| DE | 1 798 067 | 10/1959 |
| DE | 43 31 626 A1 | 3/1995 |
| EP | 0 481 423 A1 | 4/1992 |
| JP | 63-227980 A | 9/1988 |
| JP | 4-179891 A | 6/1992 |
| JP | 11-173278 A | 6/1999 |
| JP | 11-343983 A | 12/1999 |
| JP | 2001-263261 A | 9/2001 |
| JP | 2001-298903 A | 10/2001 |

\* cited by examiner

Primary Examiner—Anthony D. Stashick
Assistant Examiner—Ryan Gillan
(74) Attorney, Agent, or Firm—Buchanan Ingersoll & Rooney PC

(57) ABSTRACT

An electric oil pump apparatus includes a pump housing a drive side communicating portion, a motor housing having a pump side communicating portion communicating with the drive side communicating portion, a bearing portion arranged at one of the drive side communicating portion and the pump side communicating portion, and a shaft rotatably supported by the bearing portion. A one end of the shaft extends in the pump housing and is provided with a drive rotor capable of feeding the oil in response to rotation of the shaft. The other end of the shaft extends in the motor housing and is provided with a permanent magnet.

13 Claims, 3 Drawing Sheets

ELECTRIC OIL PUMP APPARATUS

CROSS REFERENCE TO RELATED APPLICATIONS

This application is based on and claims priority under 35 U.S.C. § 119 with respect to a Japanese Patent Application 2002-068445, filed on Mar. 13, 2002, the entire content of which is incorporated herein by reference.

FIELD OF THE INVENTION

This invention generally relates to an electric oil pump apparatus.

BACKGROUND OF THE INVENTION

A known electric oil pump apparatus has been disclosed in a Japanese Patent Laid-Open published as No. H11 (1999)-173278. The disclosed electric oil pump apparatus includes a drive rotor shaft, of which both ends are supported by bearings in a pump housing, and a motor rotation shaft of which both ends are supported by bearings in a motor housing. The drive rotor shaft and the motor rotation shaft are axially connected via a jointing portion. A motor driving force is transmitted to the drive rotor shaft via the jointing portion and a drive rotor is rotated in response to rotation of the drive rotor shaft, thereby oil in the pump housing can be fed being applied with a pressure. Therefore, the disclosed electric oil pump apparatus functions as an oil pump apparatus in which the oil is inhaled from an oil suction port defined in the pump housing and is discharged from an oil discharging port defined therein.

However, the disclosed oil pump apparatus may have following problems to be solved. The drive rotor shaft and the motor rotation shaft axially arranged are connected by means of a jointing portion. In this case, an axial length of the electric oil pump apparatus becomes longer and mechanical loss may occur with the jointing portion. Further, each shaft requires two bearings to be supported at both ends thereof so that the number of assemblies in the oil pump apparatus may be increased. Therefore, the disclosed electric oil pump apparatus seems to possess a relatively complicated structure.

The present invention therefore seeks to provide an improved electric oil pump apparatus of which structure is relatively simple.

SUMMARY OF THE INVENTION

According to an aspect of the present invention, an electric oil pump apparatus of the present invention includes a pump housing having a suction port for inhaling oil, a discharging port for discharging the oil, and a drive side communicating portion, a motor housing having a pump side communicating portion communicating with the drive side communicating portion, a bearing portion arranged at one of the drive side communicating portion and the pump side communicating portion, and a shaft rotatably supported by the bearing portion. A one end of the shaft extends in the pump housing and is provided with a drive rotor capable of feeding the oil in response to rotation of the shaft. The other end of the shaft extends in the motor housing and is provided with a permanent magnet. An electromagnetic coil is fixed to the motor housing at a position with a predetermined distance from the permanent magnet in a radially outward direction of the shaft and is capable of rotating the shaft by controlling exciting operation applied to the electromagnetic coil.

A yoke can be fixed to the other end of the shaft and is disposed between the shaft and the permanent magnet. Alternatively, the permanent magnet can be connected to the shaft via a fixing portion made of a yoke.

The pump housing is provided with an oil controlling member and a mounting member for mounting the electric oil pump apparatus to a member which is not the electric oil pump apparatus.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

An oil pump apparatus 10 (an electric oil pump apparatus) according to an embodiment of the present invention is described hereinbelow with reference to the attached drawings.

Figure 1:
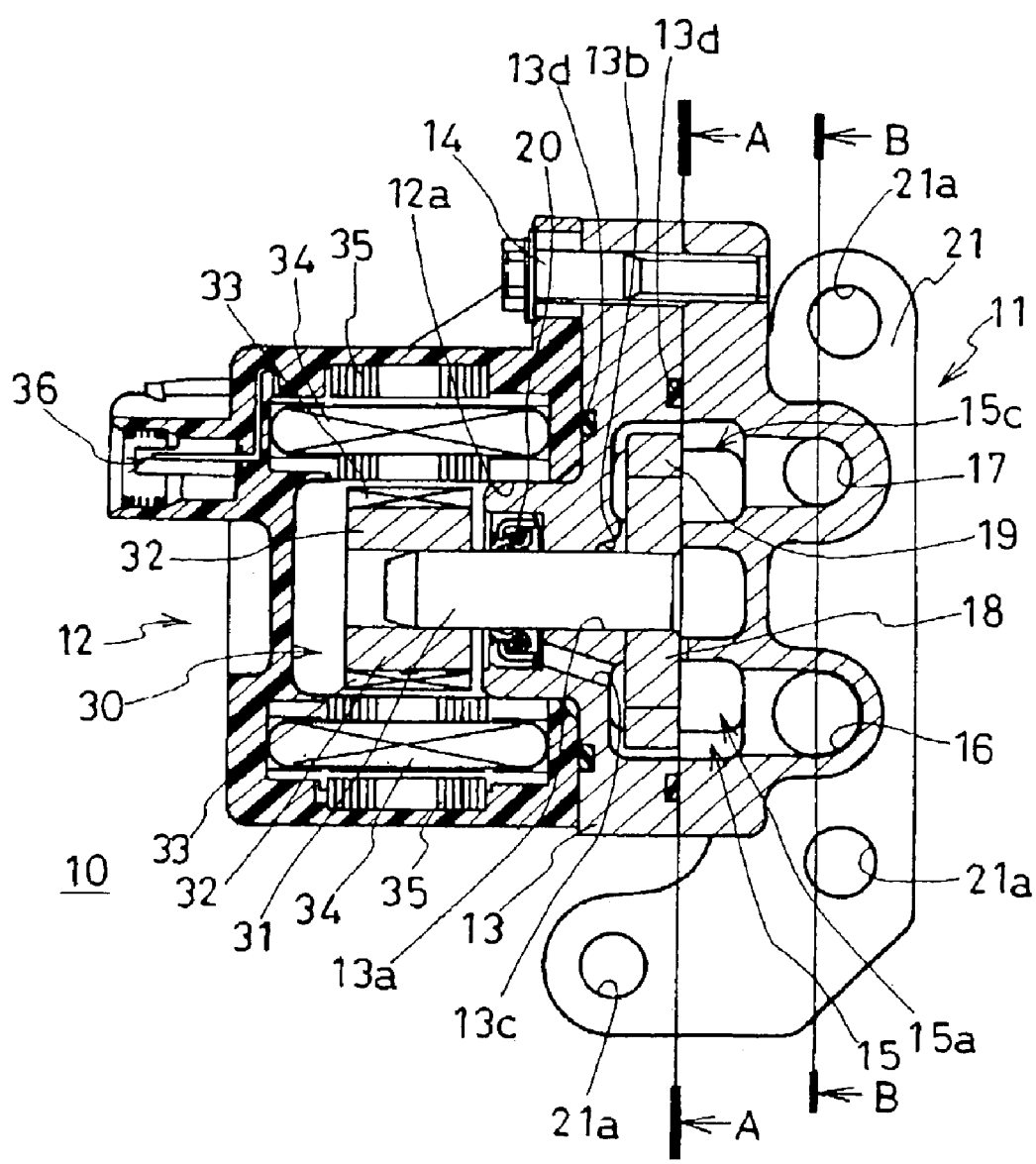
FIG. 1 is a vertical cross sectional view illustrating an oil pump apparatus according to an embodiment of the present invention.

As especially seen in FIG. 1, the oil pump apparatus 10 is provided, for example for a vehicle engine (not shown) and functions to electrically feed oil being applied with pressure and accumulated in an oil pan to lubricating devices of the engine. An outer shape of the oil pump apparatus 10 is formed with a pump housing (a pump housing) 11 made of metal such as aluminum, a resin-made motor housing (a motor housing) 12, and a bearing plate (a pump housing) 13 which is made of metal such as aluminum and is disposed between the pump housing 11 and the motor housing 12. The pump housing 11, the motor housing 12, and the bearing plate 13 are all assembled as a single unit by means of bolts 14. O-rings 13d are disposed between the pump housing 11 and the bearing plate 13 and between the motor housing 12 and the bearing plate 13.

Figure 3:
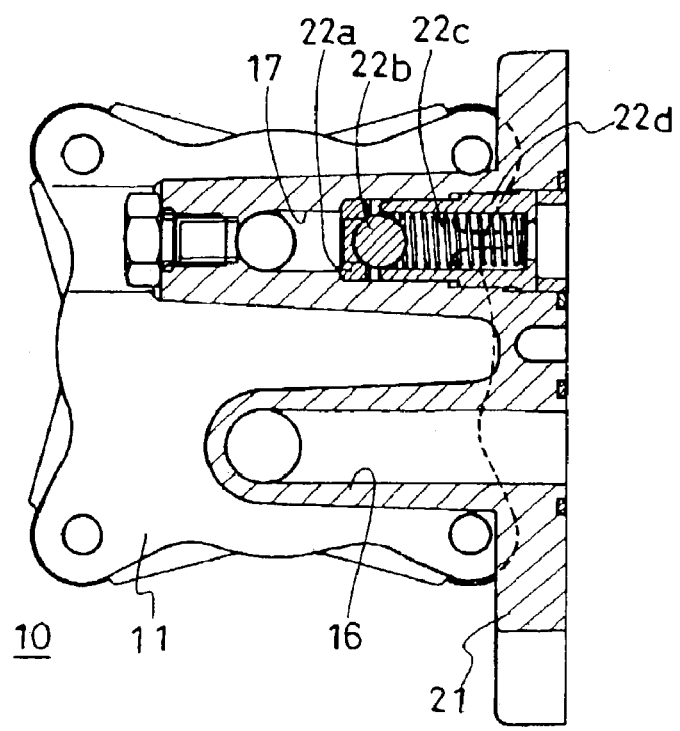
FIG. 3 is a cross sectional view of FIG. 1 taken along a line B—B.

The bearing plate 13 is arranged to cover an opening substantially axially opening in a direction of the motor housing 12, i.e. in a left-hand side in FIG. 1. An oil chamber 15 is then defined in an inner space between the pump housing 11 and the bearing plate 13. The pump housing 11 is provided with an oil suction port (a suction port) 16 for inhaling the oil into the oil chamber 15 and an oil discharging port (a discharging port) 17 for discharging the oil. The pump housing 11 including the oil chamber 15, the suction port 16 and the discharging port 17 are illustrated in FIG. 3 in more details.

The bearing plate 13 is provided with a bearing opening portion (a drive side communicating portion and a bearing portion) 13a for disposing a metal-made shaft (shaft) 31 which is one of assembled members of a motor 30 (described later) therein. In other words, the shaft 31 extends in the pump housing 11 and the motor housing 12 via the bearing opening 13a. The bearing opening 13a functions for bearing the shaft 31 and further for rotating the shaft 31 around an axis thereof.

The motor housing 12 is formed so as to mold the motor 30 and possesses an opening portion (a pump side communicating portion) 12a opening in a direction of the pump housing 11, i.e. in the right-hand side in FIG. 1, for communicating with the bearing opening portion 13a.

Figure 5:
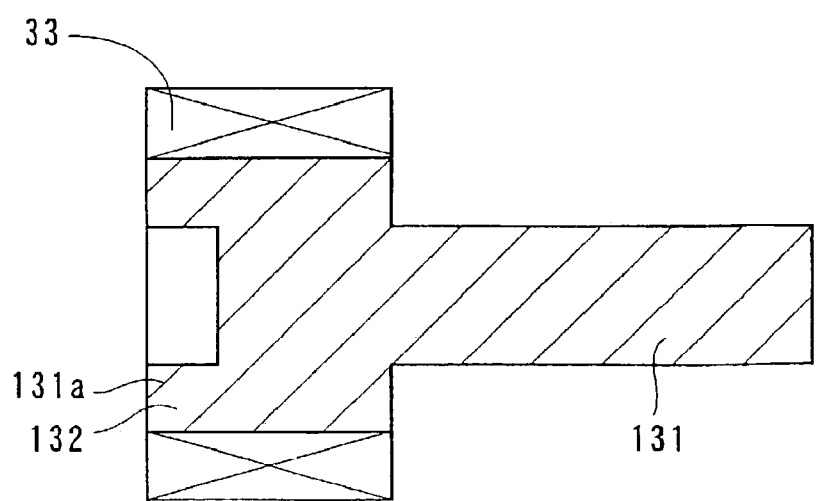
FIG. 5 is a cross sectional view illustrating a shaft and a magnet for use in the oil pump apparatus according to a modified example of the first embodiment of the present invention.

The motor 30 includes various elements such as the shaft 31, a back yoke (yoke) 32, plural magnets (a permanent magnet) 33, and plural coils (an electromagnetic coil) 34. The back yoke 32 is a magnetic material having a substantially cylindrical shaped structure and is fixed to a tip end (the other end) of the shaft 31 in the motor housing 12. In this case, the shaft 31 is pressed into an inner peripheral surface of the back yoke 32 so as to be assembled thereto. The plural magnets 33 are fixed to an outer peripheral surface of the back yoke 32 so as to arrange north and south poles of the magnets 33 by turns. A magnetic property of the magnets 33 can be effectively improved in favor of the back yoke 32. According to the embodiment of the present invention, the back yoke 32 and the shaft 31 are separated from each other. Alternatively, as illustrated in FIG. 5, a fixing portion 131a can be integrally provided at an outer peripheral portion of a shaft 131. The fixing portion 131a possesses an approximately cylindrical shaped structure and is fixed with the magnets 33. The fixing portion 131a can function in the substantially same manner as the back yoke 132. In this case, a part of the shaft 131 is made of a yoke so that the magnetic property of the magnets 33 and the like can be improved with a simple structure.

Figure 4:
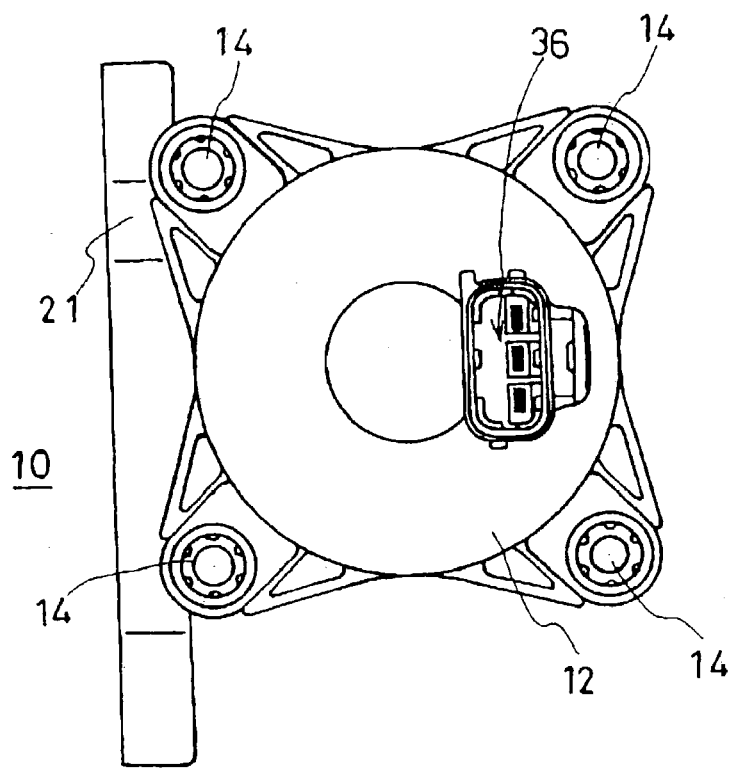
FIG. 4 is a side view illustrating the oil pump apparatus in view of a motor side according to the embodiment of the present invention.

A plurality of metal-made cores 35 are fixed to an inner surface of the motor housing 12 with a predetermined distance relative to the magnets 33 in a radially outward direction of the shaft 31 and along a circumferential direction of the shaft 31. The coils 34 are wound around the respective cores 35. That is, the plural coils 34 are fixed to the motor housing 12 with a predetermined distance relative to the magnets 33 in the radially outward direction of the shaft 31. The respective coils 34 are connected to a controller (not shown) of the oil pump apparatus 10 via terminals 36 (illustrated in FIGS. 1 and 4) so as to control exciting operation of the respective coils 34. When the exciting operation of each coil 34 is controlled, excitation phases of the respective coils 34 are switched. Therefore, the magnets 33, the back yoke 32, and the shaft 31 are integrally rotated about the axis of the shaft 31.

Figure 2:
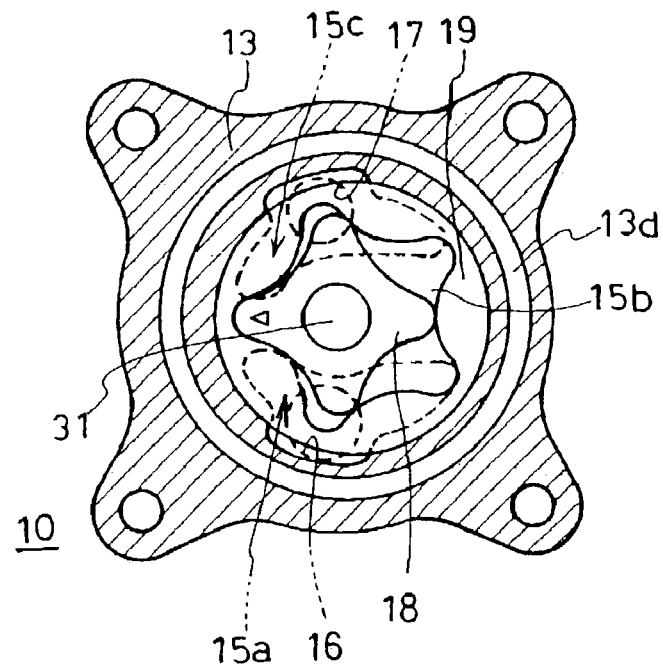
FIG. 2 is a cross sectional view of FIG. 1 taken along a line A—A.

As illustrated in FIGS. 1 and 2, a tip end (one end) of the shaft 31 in the pump housing 11 is pressed into an internal diameter portion of a metal-made inner rotor (a drive rotor) 18 and is equipped therewith. Therefore, the shaft 31 and the inner rotor 18 are rotated as a single unit about the axis of the shaft 31. An outer rotor (a drive rotor) 19 is disposed around the inner rotor 18. That is, the oil pump apparatus 10 having the inner rotor 18 and the outer rotor 19 around the inner rotor 18 according to the embodiment of the present invention is a trochoid type pump. The inner rotor 18 possesses four teeth and the outer rotor 19 possesses five teeth. The outer rotor 19 is rotated relative to the pump housing 11 when being engaged with the inner rotor 18 in response to the rotation of the inner rotor 18. In this case, the outer rotor 19 is rotated around an axis of the inner rotor 18 in an eccentric manner, i.e. is rotated around the shaft 31 in an eccentric manner.

The oil chamber 15 of the pump housing 11 includes a suction side oil chamber 15a, which communicates with the suction port 16, a discharging side oil chamber 15c, which communicates with the discharging port 17, and lobe oil chambers 15b, which are clearances between the respective teeth of the inner rotor 18 and the outer rotor 19. The volume of each clearance is varied in response to the rotation of the rotors 18 and 19. When the lobe oil chamber 15b is in contact with the suction side oil chamber 15a, the volume of the lobe oil chamber 15b is increased in response to the rotation of the rotors 18 and 19. An inner space of the lobe oil chamber 15b then reaches a negative pressure level and the oil is inhaled into the lobe oil chamber 15b from the suction side oil chamber 15a, wherein the inner space thereof is filled in with the oil. The lobe oil chamber 15b becomes in contact with the discharging side oil chamber 15c in response to a further rotation of the rotors 18 and 19. In this case, the oil is discharged from the lobe oil chamber 15b to the discharging side oil chamber 15c in accordance with the decrease of the volume of the lobe oil chamber 15b. As described above, the oil is fed being applied with a pressure corresponding to the rotation of the inner rotor 18 and the outer rotor 19.

An oil seal 20 made of rubber is disposed in the bearing opening portion 13a at a side of the motor 30 and is adhered to the shaft 31, thereby the oil can be prevented from leaking from the oil chamber 15 to the motor 30. A notch portion 13b is defined at a portion of the bearing opening 13a at a side of the oil chamber 15. The oil in the oil chamber 15 can permeate to a portion of the shaft 31 supported by the bearing opening portion 13a via the notch portion 13b. Therefore, the shaft 31 can be rotated in the bearing opening portion 13a with a preferable lubricity. Further, a communicating bore 13c is defined in the bearing plate 13 for communicating the oil seal 20 and the oil chamber 15, wherein the oil accumulated in the oil seal 20 can be returned to the oil chamber 15.

As especially seen in FIGS. 1 and 3, a mounting plate (a mounting member) 21 is integrally equipped to the pump housing 11 for mounting the oil pump apparatus 10 on an hydraulic equipment (not shown). The mounting plate 21 is provided with plural mounting bores 21a. The oil pump apparatus 10 according to the embodiment of the present invention is fixed to the hydraulic equipment by disposing a fastening member such as a bolt into each mounting bore 21a.

The suction port 16 and the discharging port 17 are defined at a right-hand edge of the pump housing 11 in FIG. 1 and respectively open in a direction of the mounting plate 21. The suction port 16 communicates with the oil pan and the like and the discharging port 17 communicates with the hydraulic equipment and the like. The discharging port 17 disposes a check valve member (an oil controlling member) 22 having a sheet check valve 22a, a ball 22b, a spring 22c, and a cage check valve 22d. The check valve member 22 allows the oil to be fed only in a discharging direction, i.e. in a right-hand side direction in FIG. 3, and does not allow the oil to be fed in an opposite direction. A relief valve can be disposed in substitution for the check valve member 22 if needed.

As described above, the oil pump apparatus 10 is provided with the pomp housing 11 in which the suction port 16, the discharging port 17, the mounting plate 21, the mounting bore 21a, and the check valve member 22 are assembled.

Therefore, the oil pump apparatus 10 can be applied to a different type of hydraulic equipment only by exchanging the pump housing 11. For example, the oil pump apparatus 10 can be applied to a hydraulic equipment with a different shape by adopting a pump housing of which mounting plate 21 possesses a modified shape. That is, the oil pump apparatus 10 according to the embodiment of the present invention can be versatile.

Next, operation of the oil pump apparatus 10 is described hereinbelow. As described above, when the exciting operation of the coils 34 is controlled by the controller of the oil pump apparatus 10, the motor 30 is activated. The shaft 31 is then rotated and the inner rotor 18 and the outer rotor 19 are turned relative the pump housing 11 therein in response to the rotation of the shaft 31. Therefore, the oil is fed from the suction port 16 to the discharging port 17, wherein the oil pump apparatus 10 effectively functions as the electric oil pump apparatus.

The torque of the motor 30 is transmitted to the inner rotor 18 and the outer rotor 19 only via the shaft 31. Therefore, the oil pump apparatus 10 according to the embodiment of the present invention is provided with less number of assemblies comparing with an oil pump apparatus provided with plural transmitting members connected to each other. The shaft 31 according to the embodiment of the present invention is supported by the bearing opening 13a. Therefore, the oil pump apparatus 10 according to the embodiment of the present invention is provided with less number of assemblies comparing with an oil pump apparatus provided with a shaft supported by bearing members at both ends thereof. Therefore, the assembling performance of the oil pump 10 can be improved at a lower cost.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric oil pump apparatus comprising:
   a pump housing having a suction port for inhaling oil and a discharging port for discharging the oil, the pump housing comprising an axially extending projecting portion possessing an outer surface;
   a motor housing comprising an opening possessing an inner surface;
   a shaft possessing one end and an other end, the one end of the shaft extending in the pump housing and provided with a drive rotor capable of feeding the oil in response to rotation of the shaft, and the other end of the shaft extending in the motor housing and provided with a permanent magnet;
   the shaft being supported by a bearing portion located on one side of the drive rotor between the drive rotor and the permanent magnet and being unsupported on an opposite side of the drive rotor;
   the axially extending projecting portion of the pump housing having the bearing portion and being positioned in the opening in the motor housing so that the outer surface of the axially extending projecting portion is engaged with the inner surface of the opening in the motor housing; and
   an electromagnetic coil fixed to the motor housing at a position with a predetermined distance from the permanent magnet in a radially outward direction of the shaft and capable of rotating the shaft by controlling exciting operation applied to the electromagnetic coil.

2. An electric oil pump apparatus according to claim 1, wherein a yoke is fixed to the other end of the shaft and is disposed between the shaft and the permanent magnet.

3. An electric oil pump apparatus according to claim 1, where a fixing portion of the shaft for fixing the permanent magnet is made of a yoke.

4. An electric oil pump apparatus according to claim 1, wherein the pump housing is provided with an oil controlling member and a mounting member for mounting the electric oil pump apparatus to a member which is not the electric oil pump apparatus.

5. An electric oil pump apparatus according to claim 2, wherein the pump housing is provided with an oil controlling member and a mounting member for mounting the electric oil pump apparatus to a member which is not the electric oil pump apparatus.

6. An electric oil pump apparatus according to claim 3, wherein the pump housing is provided with an oil controlling member and a mounting member for mounting the electric oil pump apparatus to a member which is not the electric oil pump apparatus.

7. An electric oil pump apparatus according to claim 1, wherein the pump housing comprises a bearing plate, and the bearing portion is arranged at the bearing plate.

8. An electric oil pump apparatus according to claim 2, wherein the pump housing is made of aluminum and the motor housing is made of resin.

9. The electric oil pump apparatus according to claim 1, wherein a free end of the shaft at the other end of the shaft does not project axially beyond the permanent magnet in an axial direction of the shaft.

10. The electric oil pump apparatus according to claim 1, wherein a free end of the shaft at the one end of the shaft does not project axially beyond the drive rotor in an axial direction of the shaft.

11. The electric oil pump apparatus according to claim 1, wherein the bearing portion is an opening formed in the axially extending projecting portion of the pump housing.

12. The electric oil pump apparatus according to claim 7, wherein the bearing portion is an opening formed in the axially extending projecting portion of the pump housing.

13. The electric oil pump apparatus according to claim 1, wherein the axially extending projecting portion of the pump housing is an end portion of the pump housing possessing a reduced diameter compared to an immediately adjoining portion of the pump housing.

* * * * *